US012236181B2

(12) United States Patent
Henninger

(10) Patent No.: US 12,236,181 B2
(45) Date of Patent: *Feb. 25, 2025

(54) SYSTEM AND METHOD FOR VERIFYING WHETHER TEXT WILL BE PROPERLY RENDERED IN A TARGET AREA OF A USER INTERFACE AND/OR A GRAPHICS FILE

(71) Applicant: Drägerwerk AG & Co. KGaA, Lübeck (DE)

(72) Inventor: Gregory Mark Henninger, Lowell, MA (US)

(73) Assignee: Drägerwerk AG & Co. KGaA, Lubeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,820

(22) Filed: Dec. 20, 2022

(65) Prior Publication Data

US 2023/0121283 A1     Apr. 20, 2023

Related U.S. Application Data

(63) Continuation of application No. 17/324,861, filed on May 19, 2021, now Pat. No. 11,551,463, which is a
(Continued)

(51) Int. Cl.
*G06F 40/103* (2020.01)
*G06F 17/00* (2019.01)
(Continued)

(52) U.S. Cl.
CPC .......... *G06F 40/103* (2020.01); *G06F 40/166* (2020.01); *G06V 10/751* (2022.01); *G06V 30/414* (2022.01)

(58) Field of Classification Search
CPC ... G06F 40/103; G06F 40/166; G06V 10/751; G06V 30/414; G06K 9/00463
(Continued)

(56) References Cited

U.S. PATENT DOCUMENTS

| 5,390,259 A * | 2/1995 | Withgott ................ G06V 30/40 |
| | | 382/173 |
| 6,441,824 B2 * | 8/2002 | Hertzfeld .............. G06F 40/109 |
| | | 345/685 |

(Continued)

OTHER PUBLICATIONS

Michael Riethmuller, Responsive And Fluid Typography With Vh And Vw Units, published May 10, 2016 smashingmagazine.com, pp. 1-16 (pdf).*

*Primary Examiner* — Manglesh M Patel
(74) *Attorney, Agent, or Firm* — Nolte Lackenbach Siegel

(57) ABSTRACT

A system and method are capable of ensuring that one or more text strings will be able to be fully rendered in a target area of a user interface or a target area of a graphics file. The system and method determine the number of pixels of first and second reference text that fit in the target area in the horizontal direction and the vertical direction, respectively, determine the number of pixels of string text in the horizontal direction and the vertical direction, and compare the number of pixels in the horizontal direction of the first reference text and the vertical direction of the second reference text respectively to the number of pixels in the horizontal direction and the vertical direction of the text string that is desired to be rendered in the target area to determine whether the text string will fit in the target area.

21 Claims, 12 Drawing Sheets

Related U.S. Application Data continuation of application No. 16/580,374, filed on Sep. 24, 2019, now Pat. No. 11,042,735.

(60) Provisional application No. 62/736,086, filed on Sep. 25, 2018.

(51) Int. Cl.
*G06F 40/166* (2020.01)
*G06V 10/75* (2022.01)
*G06V 30/414* (2022.01)

(58) Field of Classification Search
USPC ............... 715/271, 800, 273, 252, 243, 200
See application file for complete search history.

(56) References Cited

U.S. PATENT DOCUMENTS

| | | | | |
|---|---|---|---|---|
| 6,452,597 | B1* | 9/2002 | Goldberg | G09G 5/00 345/472 |
| 8,175,387 | B1* | 5/2012 | Hsieh | G06V 10/754 382/181 |
| 2005/0050462 | A1* | 3/2005 | Whittle | G06F 3/0481 715/205 |
| 2010/0145676 | A1* | 6/2010 | Rogers | G06F 40/157 704/9 |
| 2013/0070289 | A1* | 3/2013 | Matsukawa | G06F 3/1208 358/1.15 |
| 2016/0246763 | A1* | 8/2016 | Higuchi | G09G 5/14 |

\* cited by examiner

SYSTEM AND METHOD FOR VERIFYING WHETHER TEXT WILL BE PROPERLY RENDERED IN A TARGET AREA OF A USER INTERFACE AND/OR A GRAPHICS FILE

CROSS-REFERENCE TO RELATED APPLICATIONS

This application is a continuation of U.S. patent application Ser. No. 17/324,861 filed on May 19, 2021, which is a continuation of U.S. patent application Ser. No. 16/580,374 filed on Sep. 24, 2019, now U.S. Pat. No. 11,042,735 issued Jun. 22, 2021, which claims the benefit of U.S. Provisional Application No. 62/736,086 filed on Sep. 25, 2018, which are incorporated by reference as if fully set forth.

FIELD

The present disclosure relates generally to a system and method for verifying whether text associated with one device will be properly rendered in a target area of a user interface of another electronic device or a target area of a graphics file. In particular, the disclosure is directed to a system and method that determines a number of pixels of string text of at least one string entry in a string file in the horizontal and vertical directions and compares the number of pixels of the string text in the horizontal and vertical directions to the determined number of pixels of first and second reference text for the target area of the user interface or graphics file in the horizontal and vertical directions, respectively, to determine whether the string text will be properly rendered in the target area of the user interface of the electronic device or the target area of the graphics file.

The present disclosure also relates generally to a system and method for verifying whether a string category is properly assigned to the target area of the user interface of the electronic device or the target area of the graphics file. In particular, the disclosure is also related to a system and method that generates pseudotranslated text having a height equal to maximum height information of a defined string category corresponding to the string category assigned to the target area and a width equal to maximum width information of the corresponding defined string category, renders the pseudotranslated text on the target area, and records whether or not the string category is properly assigned to the target area based on whether the pseudotranslated text is fully rendered on the target area.

BACKGROUND

In many areas of technology, it is common to have a primary electronic device with a user interface (e.g., a graphical user interface) that is designed to interact with any number of other devices (e.g., peripheral devices). These other devices can, for example, expand the functionality of the primary device. In a situation where a peripheral device is connected to a primary device, it is not uncommon for information (i.e., data) associated with or collected by the peripheral device to be rendered on a target area of the user interface of the primary device. Additionally, these peripheral devices can also be used to provide information that will be rendered in a target area of a graphics file that is to be displayed, printed, or otherwise referenced. It is noted that the term "render" means the generation of pixels that represent text to be displayed or to be placed into a graphics file.

However, a potential issue with rendering information from the peripheral device, such as a text string, on the user interface of the primary device or in a graphics file, is the size of the target area of the user interface of the primary device or the graphics file. That is, if the text string transmitted by the peripheral device to the primary device or the graphics file is too large to be rendered on the target area, the text string potentially could only be partially rendered or not rendered at all on the target area.

In addition to not being user friendly, the failure to properly and completely render the text string from the peripheral device on the target area could be extremely dangerous depending on the area of technology. An example of this is in the area of medical devices. In such a scenario, the primary device could be a patient monitoring system that is used to monitor a patient in the hospital and the peripheral device could be a pulse oximeter that monitors the oxygen saturation of the patient's blood. If the pulse oximeter transmits data detailing the patient's current blood oxygen level as a text string that is too large to be properly rendered on a target area of the user interface of the patient monitoring system, the hospital worker monitoring the user interface of the patient monitoring system might not be able to determine if the patient's blood oxygen level falls to a dangerously low level.

In an attempt to prevent a situation where a text string generated by a device does not fit in the target area of a user interface of a primary device, there is a system whereby the size of the target area of the primary device is provided in terms of a maximum number of characters (i.e., a character count) of a given font and font size that will fit in the target area of the user interface of the device. With this system, the manufacturers of peripheral devices can design their devices to use text strings that do not exceed the number of characters associated with the target area of the user interface of the primary device to which they intend to have their peripheral device connect.

However, a significant problem with using the maximum number of characters of a given font and font size as the basis for determining whether a text string will fit in the target area of the user interface of a device is that characters do not all have the same width and height. As such, character counts have only a loose correlation to the actual width of the text string. Therefore, even if a text string has a character count that is no greater than the maximum number of characters designated for a target area of a user interface, there is still the possibility that, for example, the text string will be too wide (i.e., long) for the target area of the user interface.

Further, there is another system in which string size is calculated based on pixels. In this system, the size of the target area of the primary device is provided in terms of a maximum number of pixels in the horizontal direction and a maximum number of pixels in the vertical direction. The system obtains the text string, determines the numbers of pixels of the text string in the horizontal direction and the number of pixels of the text string in the vertical direction, and compares the number of pixels of the text string in horizontal direction to the maximum number of pixels in the horizontal direction and the number of pixels of the text string in the vertical direction to the maximum number of pixels in the vertical direction to determine whether or not the text string will fit in the target area of the primary device.

While this system does rely on pixels to determine whether the text string will fit in the target area of the primary device, it still has a number of problems associated with it. A first problem is that the system requires a user to manually input the maximum number of pixels in the horizontal direction and the maximum number of pixels in the vertical direction. Due to the lack of standardized size categories, there are no safeguards to ensure that the string size maximums in the horizontal and vertical directions are input correctly. Therefore, the system is unable to identify a situation where a user has incorrectly entered the maximum number of pixels in the horizontal direction and/or the vertical direction.

Another problem with this system is that the size of the target area of the primary device is input as a maximum number of pixels in the horizontal and vertical directions, while the text string is input as a string of text. The system then determines the number of pixels of the text string in the horizontal and vertical directions prior to comparing these pixel counts to the maximum pixel numbers. However, software programs do not all render text in the same manner. Thus, depending on how a given software program renders text (e.g., the number of pixels per inch), different software programs can determine that the same text in the same font and font size has different heights and/or widths in terms of the number of pixels. As a result, even if this system determines that a text string will be properly rendered in the target area of a primary device based on its determined number of pixels in the horizontal and vertical directions for the text string, this determination might not be accurate if the software program of the primary device renders the string text in a different manner than the system performing the determination.

In light of the above problems associated with the current systems, there is a need for a system and method that is capable of verifying whether a text string will be properly rendered (i.e., fit) in a target area of a user interface or graphics file.

SUMMARY

In light of the above, the present disclosure is broadly directed to a system and method that is capable of ensuring that one or more text strings associated with a device will be able to be fully rendered in a target area of another device's user interface or a target area of a graphics file. Instead of relying on a maximum number of characters of a certain font and font size for determining whether the text string of a device will be able to be properly rendered in the target area of the user interface of the other device or the target area of the graphics file, the present system and method determine the number of pixels of first and second reference text that fit in a target area in the horizontal direction and the vertical direction, respectively, determine the number of pixels of string text in the horizontal direction and the vertical direction, and compare the number of pixels in the horizontal direction of the first reference text and the vertical direction of the second reference text respectively to the number of pixels in the horizontal direction and the vertical direction of the text string that is desired to be rendered in the target area to determine whether the text string will fit in the target area. By utilizing the number of pixels in the horizontal direction and the vertical direction instead of a maximum character count, the above-described problem associated with different characters having different widths and heights can be avoided.

Further, instead of manually entering a maximum number of pixels in the horizontal and vertical directions, which are used for the comparison with the string text, the present system and method receives a string category that includes data capable of generating first and second reference text for the target area. The present system and method then generate the first and second reference text and use this reference text to determine the maximum number of pixels of the target area in the horizontal and vertical directions, respectively.

Since the present system and method determine (1) the maximum number of pixels of the first reference text in the horizontal direction and the maximum number of pixels of the second reference text in the vertical direction, and (2) the number of pixels of the string text in the horizontal and vertical directions, the above problem associated with different software programs rendering text differently can be addressed. If other software programs render text differently (i.e., shorter/taller/wider/narrower) than the present system and method, they will do so proportionately. Thus, by using first and second reference text that represent the maximum number of pixels of the target area in the horizontal and vertical directions, respectively, as the basis of determining whether string text will be properly rendered, the results of the present system and method will be accurate regardless of whether or not the primary device renders text differently. As such, the results of the present system and method are stable.

Additionally, by associating a specific target area of a user interface of a primary device or graphics file with a defined string category that includes data capable of generating the first and second reference text for that target area, it is possible for any manufacturer to determine if all of the text strings associated with their peripheral device will fit in the intended target area of the user interface of the primary device or graphics file before actually connecting to the primary device or inputting information into the graphics file. Further, using a string category is much more reliable than manually entering maximum numbers of pixels for the horizontal and vertical directions. Regarding this, for example, the present system and method can check to see of the string category that has been received matches a defined string category. If the two do not match, the system and method are capable of generating a notification that the string category does not exist.

Since the present system and method operate based on the association between a specific target area of a user interface of a primary device or graphics file and a defined string category, it is also important to ensure that the string category, which corresponds to the defined string category, has been properly assigned to the target area. If an incorrect string category is assigned to the target area, the generated first and second reference text will be based on data of the wrong defined string category. This could lead to an incorrect determination that all of the text strings associated with a manufacturer's peripheral device can be fully rendered in the intended target area. If this occurs and is not discovered until after the peripheral device is put into service, the above-discussed danger associated with the failure to properly and completely render a text string from the peripheral device on the target area could happen. Further, even if this problem is discovered prior to the peripheral device being put into service, the cost of rechecking all of the text strings associated with the peripheral device can be expensive, especially if a large number of the peripheral devices have been produced and need to be subsequently modified based on the results obtained after the proper defined string category is associated with the target area.

In order to ensure that the string category assigned to a target area of a user interface or graphics file correctly corresponds to a defined string category, the present disclosure is also broadly directed to a system and method that are capable of verifying that the string category assigned to the target area of a user interface or graphics file is properly assigned. To achieve this, the system and method generate pseudotranslated text having a width equal to a maximum width of a defined string category that corresponds to the string category associated with the target area, and a height equal to a maximum height of the corresponding defined string category. The generated pseudotranslated text can have various characteristics that aid in making a determination as to whether it is fully rendered.

The pseudotranslated text is then rendered on the target area of the user interface or graphics file. As the pseudotranslated text has the maximum width and the maximum height associated with the corresponding defined string category, if the pseudotranslated text is fully rendered in the target area, the string category assigned to the target area and corresponding to the defined string category is properly assigned to the target area. On the other hand, if the pseudotranslated text is not fully rendered in the target area, it is determined that the string category is not properly assigned to the target area.

As the present system and method is capable of verifying whether a string category is properly assigned to a target area of a user interface or graphic file, the above-described problems associated with having an incorrect string category assigned to a target area of a user interface or graphics file can be avoided.

Thus, the present system and method greatly reduce the costs of a peripheral device manufacturer with respect to the development and testing of a peripheral device that needs to be fully compatible with a specific primary device or graphics file by providing better standardization, more automated workflows, and more accurate size determinations. Further, the present system and method greatly reduce the possibility that a dangerous situation will occur due to the failure to properly and completely render a text string from the peripheral device on the primary device or graphics file.

BRIEF DESCRIPTION OF THE DRAWINGS

The following detailed description references the drawings, wherein.

DETAILED DESCRIPTION

Figure 1:
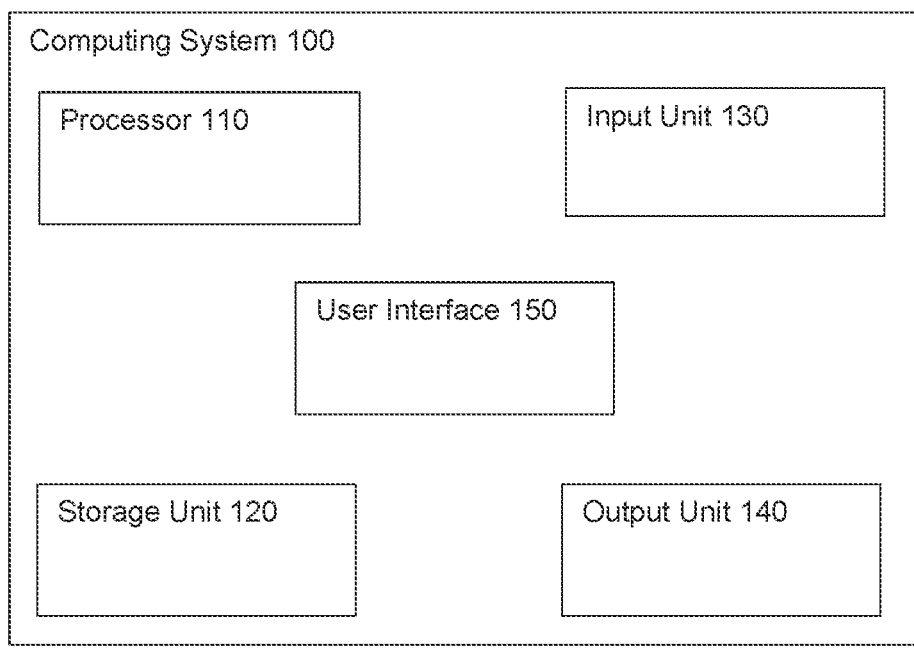
FIG. 1 is a block diagram of an example computing system 100 that is capable of executing the first and second embodiments of the disclosure.

The following description is made with reference to the accompanying drawings and is provided to assist in a comprehensive understanding of various example embodiments of the present disclosure. It includes various details to assist in that understanding, but these are to be regarded as merely examples. Accordingly, those of ordinary skill in the art will recognize that various changes and modifications of the examples described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a processor" or "a memory" includes reference to one or more of such processors or memories.

The expressions such as "include" and "may include" which may be used in the present disclosure denote the presence of the disclosed functions, operations, and constituent elements, and do not limit the presence of one or more additional functions, operations, and constituent elements. In the present disclosure, terms such as "include" and/or "have", may be construed to denote a certain characteristic, number, operation, constituent element, component or a combination thereof, but should not be construed to exclude the existence of or a possibility of the addition of one or more other characteristics, numbers, operations, constituent elements, components or combinations thereof.

In the present disclosure, the expression "and/or" includes any and all combinations of the associated listed words. For example, the expression "A and/or B" may include A, may include B, or may include both A and B.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be overly interpreted.

FIG. 1 is a diagram illustrating a computing system 100 that is capable of implementing the first and second embodiments of the present disclosure. The computing system 100 includes a processor 110, a storage unit 120, an input unit 130, an output unit 140, and a user interface 150.

The processor 110 may be one or more central processing units (CPUs), microprocessors, and/or other hardware devices suitable for retrieval and execution of instructions stored in the storage unit 120 and/or another storage device (e.g., a non-transitory computer readable storage medium). The processor 110 may fetch, decode, and execute program instructions and/or executable code (i.e., a program) to determine whether string text will fit in a target area of a user interface or graphics file, as described below in the first embodiment of the disclosure. Additionally, the processor 110 may fetch, decode, and execute program instructions and/or executable code (i.e., a program) to determine whether a string category is properly assigned to a target area of a user interface or graphics file, as described below in the second embodiment of the disclosure. As an alternative or in addition to retrieving and executing instructions, the processor 110 may include one or more electronic circuits comprising a number of electronic components for performing the functionality of one or more of the instructions.

The storage unit 120 may be any non-transitory machine-readable storage medium for maintaining data accessible to the computing system 100. For example, the storage unit 120 may include one or more hard disk drives, solid state drives, tape drives, and/or any other storage devices. The storage devices may be located in the computing system 100 and/or in another device that is in communication with the computing system 100. For example, the storage unit 120 may be any electronic, magnetic, optical, or other physical storage device that stores executable code. Thus, the storage unit 120 may be, for example, Random Access Memory (RAM), an Electrically-Erasable Programmable Read-Only Memory (EEPROM), a storage drive, an optical disc, and the like. As described in detail below, the storage unit 120 may include executable code for determining whether string text will fit in a target area of a user interface of a device or a target area of a graphics file and/or for determining whether a string category is properly assigned to a target area of a user interface or graphics file. As also detailed below, the storage unit 120 may maintain and/or store the data and information described herein.

The input unit 130 may include hardware and/or software components that are configured to allow the computing system 100 to receive data and information, via wired and/or wireless communication, from other electronic devices, such as a computer, a server, a handheld device, a removable storage medium, and the like.

The output unit 140 may include a display, such as a liquid crystal display, a touch screen, a speaker, a printer, and/or hardware and/or software components that are configured to allow the computing system 100 to output data and information, via wired and/or wireless communication, to other electronic devices, such as a computer, a server, a handheld device, a removable storage medium, and the like.

The user interface 150 may include a keyboard, a mouse, a microphone, a touch screen, and the like.

The program instructions (e.g., executable code) executed by the computing system 100 to determine whether string text will fit in a target area of a user interface of a device or a target area of a graphics file and/or to determine whether a string category is properly assigned to a target area of a user interface or graphics file can be created using one or more programming languages such as, e.g., Java®, C, C++, C #, Visual Basic®, VB.NET, Perl, Ruby®, Python, or other programming languages, possibly using object oriented design and/or coding techniques.

First Embodiment

Figure 2:
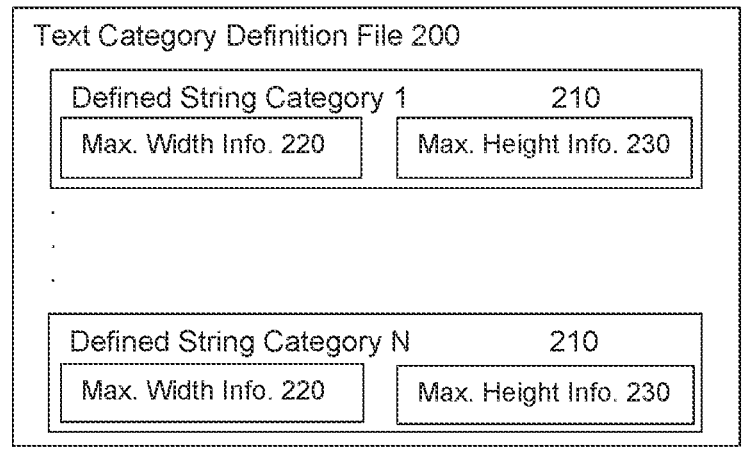
FIG. 2 illustrates a text category definition file 200.

The computing system 100 executes the method of the first embodiment by utilizing two files, a text category definition file 200 and a string file 300. FIG. 2 schematically illustrates an example of the text category definition file 200, which can be implemented in any number of formats including, for example, XML format. The text category definition file 200 contains a list of (i.e., one or more) defined string categories 210. Each of the defined string categories 210 can be based on a predefined standard, such as IEEE 11073-10207, and correspond to a target area of a user interface of a device or a graphics file in which string text is to be rendered. The target area can be a display, such as a liquid crystal display (LCD), of the device or a specific portion of the display that is, for example, displaying a graphical user interface. In other words, if the display is displaying a graphical user interface, the graphical user interface may have, as the target area, a designated area (i.e. window) in which the string text is to be rendered. Further, the target area may be a defined area within a graphics file designated to contain particular information. The graphics file can be displayed, printed or otherwise output.

Further, a single device may be associated with a number of defined string categories 210. The device may include a number of modes whereby the target area associated with each of the modes is different in size and/or location on the display. As an example, the device could be a patient monitoring system having a first mode where the oxygen saturation of a patient's blood is rendered in a window having a first size on the display (i.e., first target area) and a second mode where the patient's heart rate is rendered in a window having a second size on the display (i.e., second target area). In this example, the first and second windows have different sizes and, therefore, are associated with different defined string categories.

The device also could have a third mode where both the oxygen saturation of the patient's blood and the patient's heart rate are rendered on the display at the same time in windows on the display having sizes that are different from those of the first and second modes, respectively. In this case, the windows used in the third mode could also be associated with different defined string categories. Thus, each of the modes of the device can be associated with one or more defined string categories 210.

Similarly, a single graphics file may be associated with one or more defined string categories 210. That is, the graphics file might have multiple target areas of different sizes respectively associated with different defined string categories. Each of the defined string categories 210 includes maximum width information 220 and maximum height information 230. The computing system 100 uses the maximum width information 220 and the maximum height information 230 of the string category 210 to generate first reference text 240 that is representative of the maximum width and second reference text 250 that is representative of the maximum height of the target area of the user interface or graphics file associated with that defined string category 210.

Figure 3:
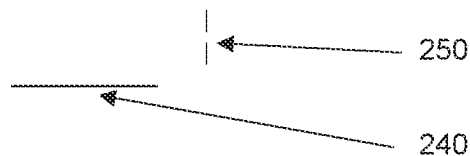
FIG. 3 illustrates an example of first reference text 240 and second reference text 250.

The maximum width information 220 can be specified as a number of full-width characters and the maximum height information 230 can specified as a number of rows of characters. The computing system 100 can use the maximum width information 220 to generate a number of full-width characters of the first reference text 240 that correspond to the maximum width of the target area. As illustrated in FIG. 3, the full-width characters used to specify the maximum width of the first reference text 240 can be, for example, em dashes (—) in a particular font and font size, such as 9-point Arial em dashes. In FIG. 3, three em dashes are illustrated as the first reference text 240. However, the character, font and font size used to indicate the maximum width are not limited to this, and other characters, fonts and/or font sizes can be used.

Further, the computing system 100 can use the maximum height information 230 to generate a number of rows of characters of the second reference text 250 that correspond to the maximum height of the target area. As illustrated in FIG. 3, the characters used to specify the maximum height of the second reference text 250 can be, for example, vertical bars (I) in a particular font and font size, such as 9-point Arial vertical bars. In FIG. 3, two vertical bars are illustrated as the second reference text 250. However, the character, font and font size used to indicate the maximum height are not limited to this, and other characters, fonts and/or font sizes can be used.

The text category definition file 200 can be a separate file that is stored on the storage unit 120 of the computing system 100. On the other hand, the text category definition file 200 can be stored, for example, at a different location that is accessible by the computing system 100 via the input unit 130 or on a removable medium that can be utilized with the computing system 100 via the input unit 130. With the text category definition file 200 being a separate file that is accessed by the computing system 100 during the execution of the instructions to determine whether string text will fit in a target area of a user interface of a device or a graphics file, the string categories 210 contained therein can be easily updated and new string categories 210 can be added without affecting the instructions. This allows the text category definition file 200 to be updated to reflect changes in user interface or graphics file design.

Figure 4:
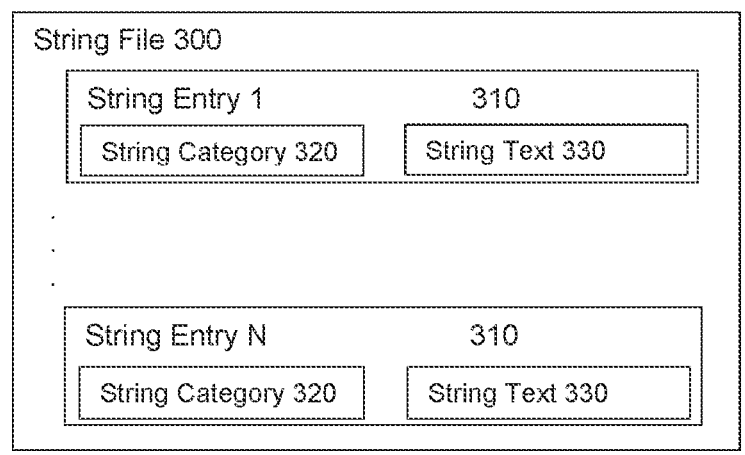
FIG. 4 illustrates a string file 300.

FIG. 4 illustrates an example of the string file 300, which also can be implemented in any number of formats including, for example, XLIFF format. The string file 300 includes a number of (i.e., one or more) string entries 310 each representing a target area of a user interface of a device or a target area of a graphics file. Each of the string entries 310 includes a string category 320 and string text 330. The string category 320 identifies the target area of the user interface of the device or the target area of the graphics file in which the string text 330 of the same string entry 310 is desired to be rendered. In other words, the computing system 100 uses the string category 320 to identify a corresponding defined string category 210 in the text category definition file 200.

The string text 330 is the text that is to be rendered in a target area of a user interface of the device or the graphics file identified by the string category 320 in the same string entry 310. The string text 330 can be in the same font and font size as the first reference text 240 and the second reference text 250 generated by the computing system 100 based on the maximum width information 220 and the maximum height information 230, respectively, contained in the corresponding defined string category 210. For example, the string text 330 can be in 9-point Arial font. However, the string text 330 is not limited to this and can be in any font and any font size, and can be completely independent of the font and font size of the first reference text 240 and the second reference text 250.

The font size of the string text 330 can be larger or smaller than that of the first reference text 240 and the second reference text 250 generated by the computing system 100 based on the maximum width information 220 and the maximum height information 230 depending on the language of the string text 330. For example, in a case where the characters of the first reference text 240 and the second reference text 250 generated by the computing system 100 are English characters and the string text 330 is in another language, such as Japanese, Chinese or Korean, the font size of the string text 330 can be increased by, for example, 12%, as compared to the font size of the first reference text 240 and the second reference text 250.

Figure 5A:
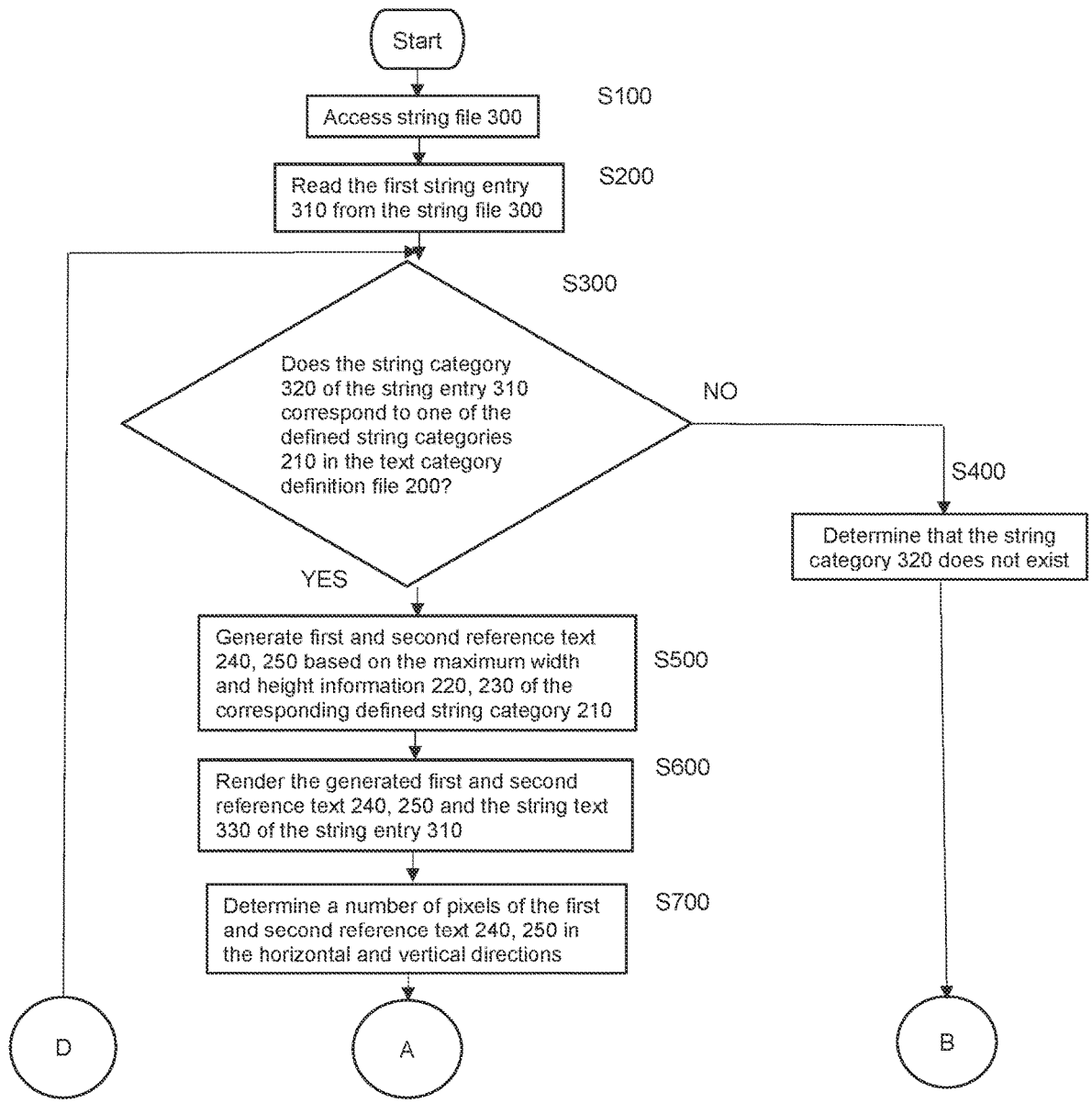
FIGS. 5A-5C illustrate a flowchart of an example method for execution by the computing system 100 for determining whether string text will fit in a target area of a user interface or graphics file according to the first embodiment of the disclosure.
Figure 5B:
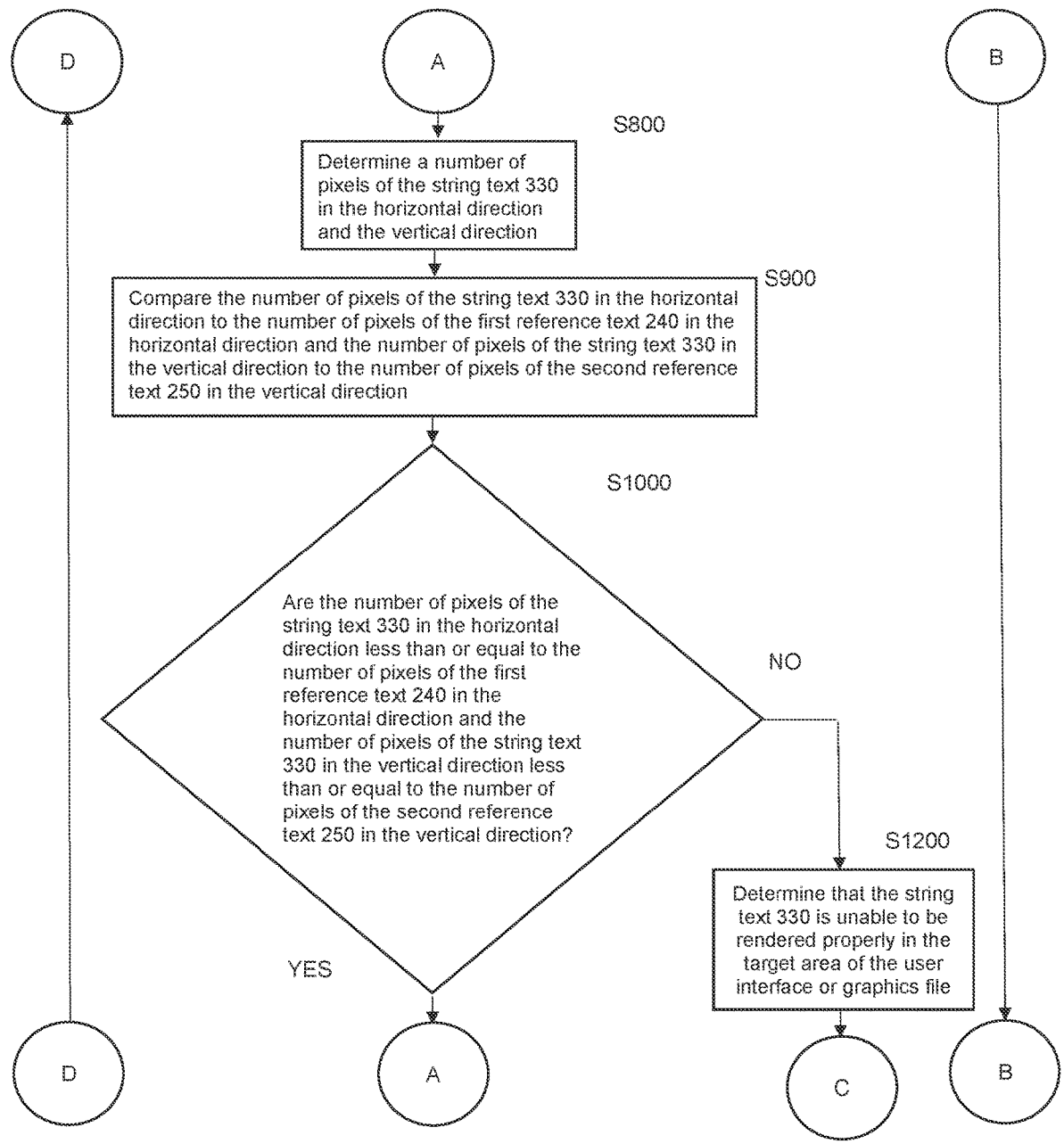
Figure 5C:
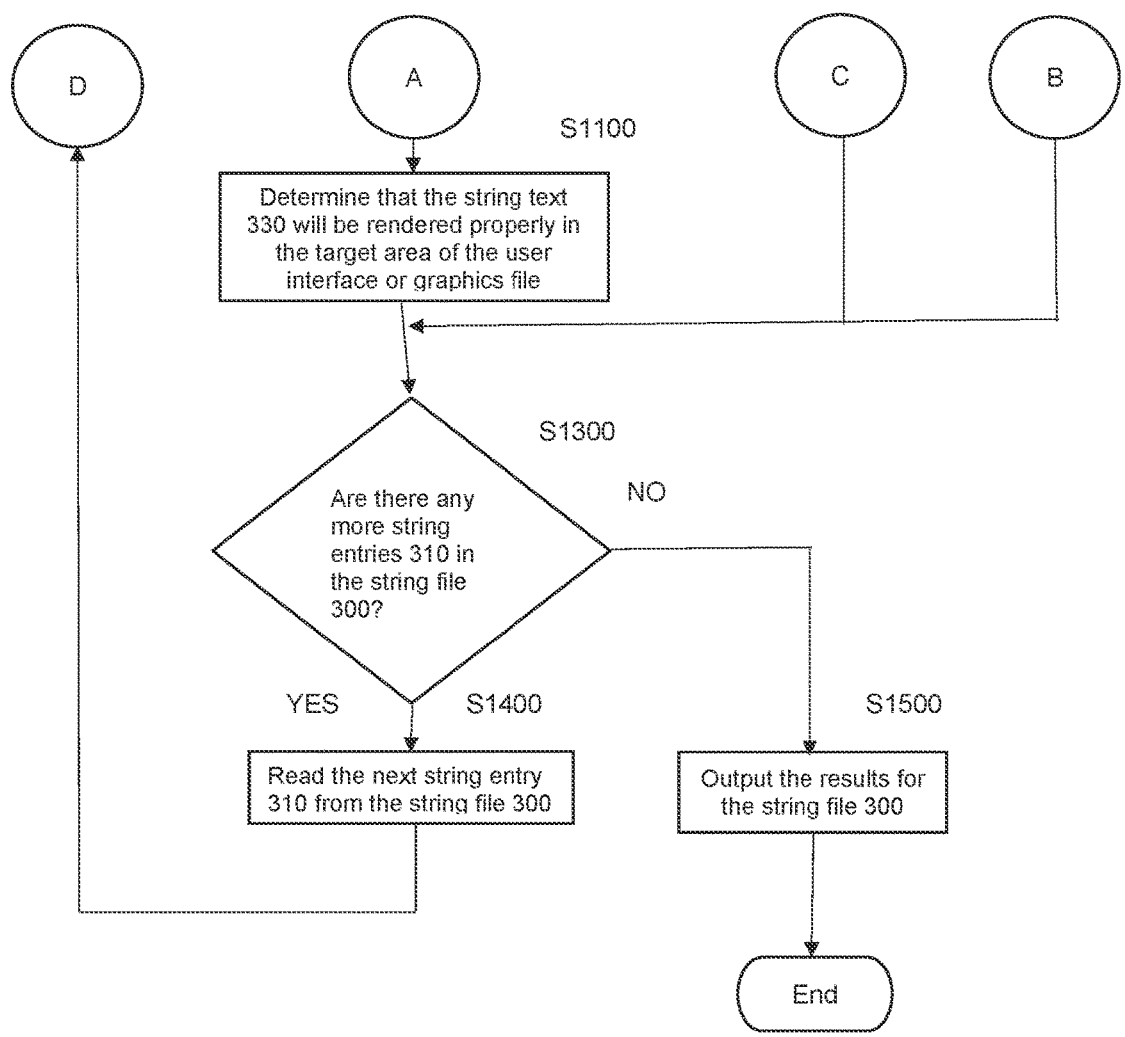

FIGS. 5A-5C illustrate an example of the method (i.e., operations) performed by the processor 110 of the computing system 100 for determining whether string text will fit in a target area of a user interface of a device or a graphics file. Initially, it is noted that the computing system 100 has the text category definition file 200 stored in the storage unit 120 or some other memory associated with the computing system 100, obtains the text category definition file 200 via the input unit 130 and stores the text category definition file 200 in the storage unit 120 or some other memory, or accesses the text category definition file 200 at a different location or on a removable medium via the input unit 130.

The computing system 100 then accesses the string file 300 having the at least one string entry 310 that includes a string category 320 and string text 330 (S100). The string file 300 can also be stored in the storage unit 120 or some other memory associated with the computing system 100, or otherwise obtained in a manner similar to the text category definition file 200 as detailed above.

After accessing the string file 300, the computing system 100 reads the first string entry 310 from the string file 300 (S200) and performs a comparison to determine whether the string category 320 associated with the first string entry 310 corresponds to a defined string category 210 stored in the text category definition file 200 (S300). If the string category 320 does not correspond to a defined string category 210 in the list of defined string categories 210 (NO), the computing system 100 determines that the string category 320 does not exist (S400). The computing system 100 also can issue a notification at this time that the string category 320 does not exist via the output unit 140.

On the other hand, if the computing system 100 determines that the string category 320 does correspond to one of the defined string categories 210 (YES), the computing system 100 generates the first reference text 240 based on the maximum width information 220 and the second reference text 250 based on the maximum height information 230 associated with the corresponding defined string category 210 (S500).

It should also be noted that the string categories 320 of the string entries 310 could have been previously selected directly from the defined string categories 210 and checked for accuracy. If this is the case, the comparison to determine whether the string category 320 associated with the first string entry 310 corresponds to a defined string category 210 stored in the text category definition file 200 (i.e., S300) becomes unnecessary, and a situation where the computing system 100 determines that the string category 320 does not exist (i.e., S400) will not occur. In other words, in this alternative scenario, the computing system 100 reads the first string entry 310 from the string file 300 (S200) and then generates the first reference text 240 based on the maximum width information 220 and the second reference text 250 based on the maximum height information 230 associated with the corresponding defined string category 210 (S500).

The maximum width information 220 and the maximum height information 230 can each be, for example, a numeric value. That is, if the maximum width information 220 is "3" and the maximum height information 230 is "2", the computing system 100 will generate the first reference text 240 as, for example, three characters and the second reference text 250 as, for example, characters in two rows. As noted above, the character(s) generated as the first reference text 240 can be, for example, full-width characters that represent the maximum width and the character(s) generated as the second reference text 250 can be, for example, a number of characters in rows (i.e., lines) that represent the maximum height.

Figure 6:
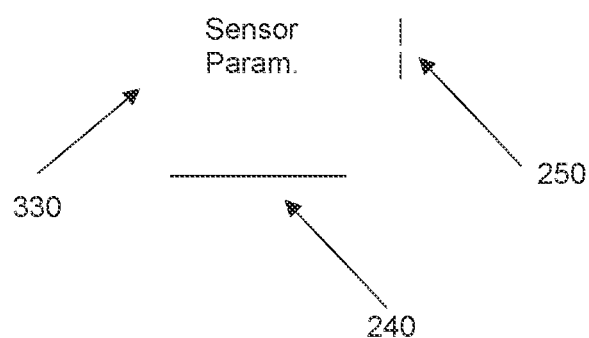
FIG. 6 illustrates a rendering of first reference text 240, second reference text 250, and string text 330.

The computing system 100 can then render the generated first reference text 240, the generated second reference text 250, and the string text 330 on the output unit 140 (S600). FIG. 6 illustrates an example of what such a rendering on the output unit 140 could look like.

Figure 7:
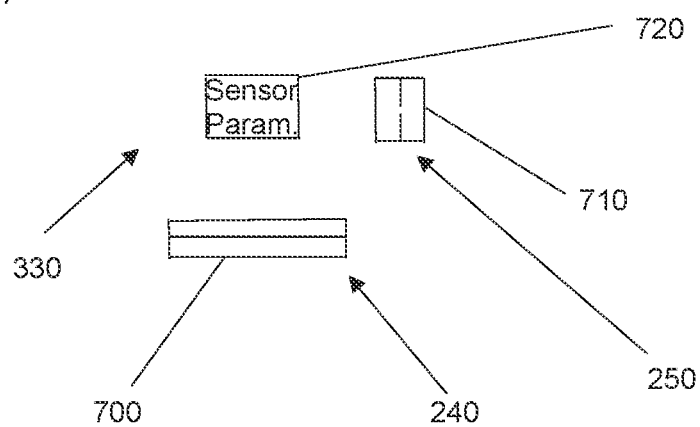
FIG. 7 illustrates a rendering of first reference text 240, second reference text 250, and string text 330 surrounded by boxes 700, 710, 720, respectively.

The computing system 100 then determines a number of pixels of the first reference text 240 in a horizontal direction and a number of pixels of the second reference text 250 in a vertical direction (S700). As illustrated in FIG. 7, the computing system 100 can obtain the number of pixels of the first reference text 240 in the horizontal direction by, for example, generating a first box 700 around all of the full-width characters of the first reference text 240 that represent the maximum width, and then determining a number of pixels in the horizontal direction contained within the first box 700. Similarly, as also illustrated in FIG. 7, the computing system 100 can obtain the number of pixels of the second reference text 250 in the vertical direction by, for example, generating a second box 710 around all of the characters of the second reference text 250 in rows that represent the maximum height, and then determining a number of pixels in the vertical direction contained within the second box 710.

Further, it is noted that the first reference text 240 and the second reference text 250 could be rendered at positions on the output unit 140 such that the computing system 100 can generate a single box that surrounds both the first reference text 240 and the second reference text 250. In this case, the number of pixels in the horizontal direction of the first reference text 240 and the number of pixels in the vertical direction of the second reference text 250 contained within the single box can be determined.

The computing system 100 also determines the number of pixels of the string text 330 in the horizontal direction and the number of pixels of the string text 330 in the vertical direction (S800). As also illustrated in FIG. 7, the computing system 100 can obtain the number of pixels of the string text 330 in the horizontal direction and vertical direction by, for example, generating a third box 720 around all of the characters of the string text 330, and then determining a number of pixels in the horizontal direction and a number of pixels in the vertical direction contained within the third box 720.

Once the number of pixels of the first reference text 240 in the horizontal direction, the second reference text 250 in the vertical direction, and the string text 330 in the horizontal and vertical directions are determined, the computing system 100 compares the number of pixels of the first reference text 240 in the horizontal direction to the number of pixels of the string text 330 in the horizontal direction, and compares the number of pixels of the second reference text 250 in the vertical direction to the number of pixels of the string text 330 in the vertical direction (S900).

The computing system then determines if the number of pixels of the string text 330 in the horizontal direction is less than or equal to the number of pixels of the first reference text 240 in the horizontal direction and the number of pixels of the string text 330 in the vertical direction is less than or equal to the number of pixels of the second reference text 250 in the vertical direction (S1000).

If the number of pixels of the string text 330 in the horizontal direction is less than or equal to the number of pixels of the first reference text 240 in the horizontal direction and the number of pixels of the string text 330 in the vertical direction is less than or equal to the number of pixels of the second reference text 250 in the vertical direction (YES), the computing system 100 determines that the string text 330 will be properly (i.e., fully) rendered in the target area of the user interface of the device (S1100). The computing system 100 can also issue a notification via the output unit 140 that the string text 330 will be properly rendered in the target area of the user interface at this time.

On the other hand, if the number of pixels of the string text 330 in the horizontal direction is greater than the number of pixels of the first reference text 240 in the horizontal direction and/or the number of pixels of the string text 330 in the vertical direction is greater than the number of pixels of the second reference text 250 in the vertical direction (NO), the computing system 100 determines that the string text 330 is unable to be rendered in the target area of the user interface of the device (S1200). The computing system 100 also can issue a notification via the output unit 140 that the string text 330 is unable to be rendered in the target area of the user interface of the device at this time via the output unit 140.

At this point, the computing system 100 makes a determination as to whether or not there are any more string entries 310 in the string file 300 (S1300). If there are more string entries 310 (YES), the computing system 100 reads the next string entry 310 (S1400), and performs the above-detailed operations with respect to the next string entry 310.

If the computing system 100 determines that there are no more string entries 310 in the string file 300 (NO), the computing system 100 can output the results for the string file 300 as a whole via the output unit 140 (S1500). That is, the computing system 100 can issue a notification that the string file 300 passes verification if all of the string entries 310 in the string file 300: (1) include a string category 320 that corresponds to a defined string category 210 in the text category definition file 200; and (2) include a string text 330 that has a number of pixels in the horizontal direction and the vertical direction that are equal to or less than the number of pixels of the first reference text 240 in the horizontal direction and equal to or less than the number of pixels of the second reference text 250 in the vertical direction, respectively. On the other hand, if even one of the string entries 310 in the string file 300 does not satisfy both conditions (1) and (2), the computing system 100 can issue a notification that the string file 300 fails the verification.

Figure 8A:
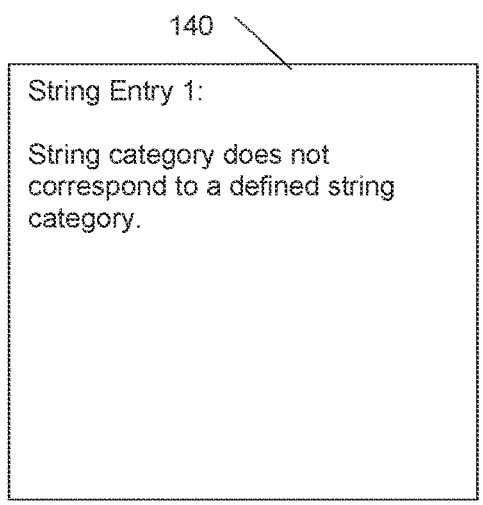
FIGS. 8A-8C illustrate examples of output from the output unit 140.
Figure 8B:
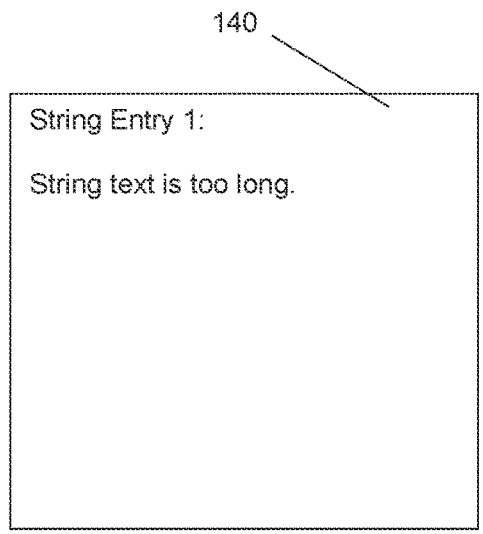
Figure 8C:
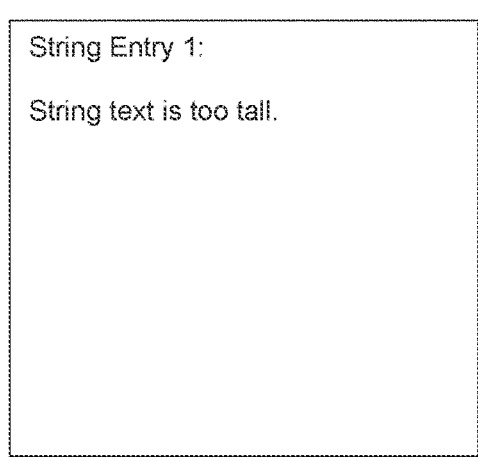

Regarding the notification that one or more of the string entries 310 fails, the computing system 100 can change the notification depending on the condition that has been failed. That is, for each of the string entries 310, the computing system 100 can issue, via the output unit 140, a notification that the string category 320 does not correspond to a defined string category 210 (FIG. 8A), a notification that the string text 330 is too long to be rendered in the target area of the user interface if the number of pixels of the string text 330 in the horizontal direction is greater than the number of pixels of the first reference text 240 in the horizontal direction (FIG. 8B), and/or a notification that the string text 330 is too tall to be rendered in the target area of the user interface if the number of pixels of the string text 330 in the vertical direction is greater than the number of pixels of the second reference text 250 in the vertical direction (FIG. 8C).

Further, it is noted that the first embodiment of the present disclosure may be implemented as any combination of a system, a method, an integrated circuit, and a computer program on a non-transitory computer readable recording medium. The processor and any other parts of the computing system may be implemented as Integrated Circuits (IC), Application-Specific Integrated Circuits (ASIC), or Large Scale Integrated circuits (LSI), system LSI, super LSI, or ultra LSI components which perform a part or all of the functions of the computing system.

Each of the parts of the first embodiment of present disclosure can be implemented using many single-function components, or can be one component integrated using the technologies described above. The circuits may also be implemented as a specifically programmed general-purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The first embodiment of the present disclosure may be implemented as a non-transitory computer-readable recording medium having recorded thereon a program embodying the methods/algorithms discussed above for instructing the processor to perform the methods/algorithms. The non-transitory computer-readable recording medium can be, for example, a CD-ROM, DVD, Blu-ray disc, or an electronic memory device.

Each of the elements of the first embodiment of the present disclosure may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above-described algorithm are exemplary, and algorithms having a sequence other than the above-described sequences are contemplated. Moreover, steps, or parts of the algorithm, may be implemented simultaneously or in parallel. It is also contemplated that the implementation of the components of the present disclosure can be done with any newly arising technology that may replace any of the above implementation technologies.

The descriptions herein of operations performed by the computing system constitute algorithms and such algorithms can be realized as a computer program on a non-transitory computer readable medium readable by applicable electronic devices serving as the computing system.

The system and method of the first embodiment of this disclosure allow string size to be verified for any display size, display resolution, and display pixel density due to the use of reference text, which decouples string size verification from user interface and/or graphics file testing. Traditionally, string size is verified by testing the text strings on the user interface. This means that if the display is changed, then the text strings need to be re-verified. However, since the system and method of the present disclosure decouple string verification from user interface and graphics file testing, text strings can be verified for any number of target user interfaces and/or graphics files simultaneously when used along with corresponding user interface and/or graphics file design considerations.

Second Embodiment

The computing system 100 executes the method of the second embodiment by utilizing three files, the text category definition file 200, the string file 300, and a string test file 900. The text category definition file 200 and the string file 300 are the same as those discussed above in the first embodiment of the disclosure.

Figure 9:
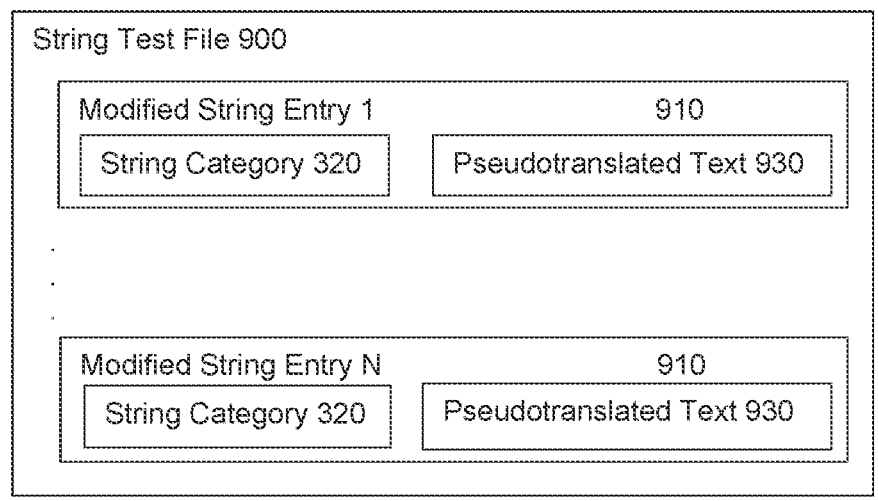
FIG. 9 illustrates a string test file 900.

FIG. 9 schematically illustrates the string test file 900, which can be implemented in any number of formats including, for example, XML format. The string test file 900 includes a number of (i.e., one or more) modified string entries 910 each corresponding to a target area of a user interface of a device or a target area of a graphics file. Each of the modified string entries 910 includes a string category 320 and pseudotranslated text 930. The string category 320 identifies the target area of the user interface of the device or the target area of the graphics file in which the pseudotranslated text 930 of the same modified string entry 910 should be fully rendered if the string category 320 is properly assigned to the target area.

The pseudotranslated text 930 is text having a size corresponding to a maximum width and a maximum height of the string category 320 of the same modified string entry 910 that can be fully rendered in the target area of the user interface or graphics file corresponding to the modified string entry 910. The pseudotranslated text 930 can be in the same font and font size as the string text 330 in the corresponding string entry 310 before the string entry 310 is modified by replacing the string text 330 with the pseudotranslated text 930 and saved in the string test file 900. The pseudotranslated text 930 can also be in the same font and font size as the first reference text 240 and the second reference text 250 generated by the computing system 100 based on the maximum width information 220 and the maximum height information 230, respectively, contained in the corresponding defined string category 210. For example, the pseudotranslated text 330 can be in 9-point Arial font. However, the pseudotranslated text 930 is not limited to this and can be in any font and any font size, and can be completely independent of the font and font size of the first reference text 240 and the second reference text 250 and the font and font size of the string text 330 in the corresponding string entry 310.

Figure 10A:
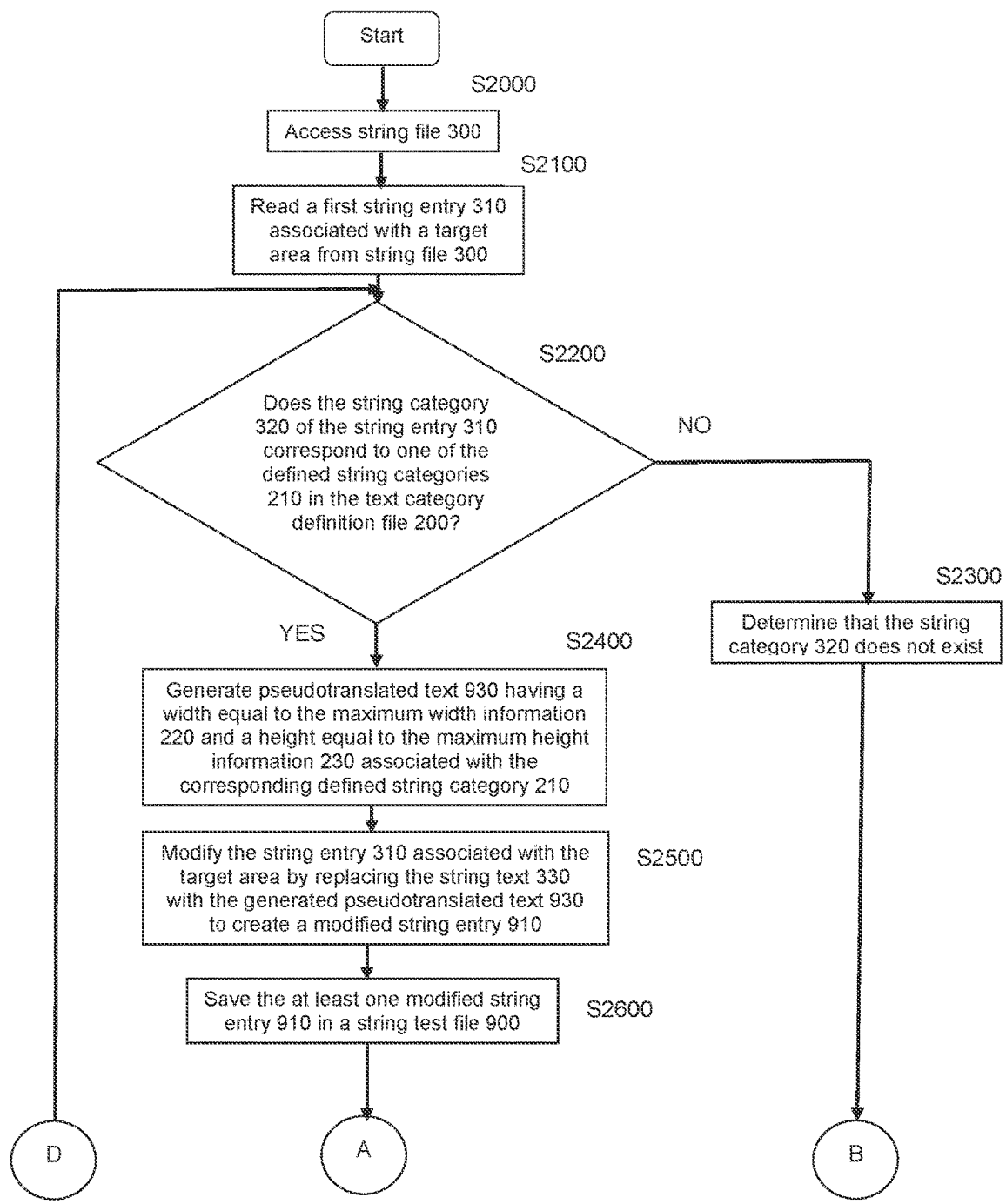
FIGS. 10A-10C illustrate a flowchart of an example method for execution by the computing system 100 for verifying whether a string category is properly assigned to a target area of a user interface or graphics file according to the second embodiment of the disclosure.
Figure 10B:
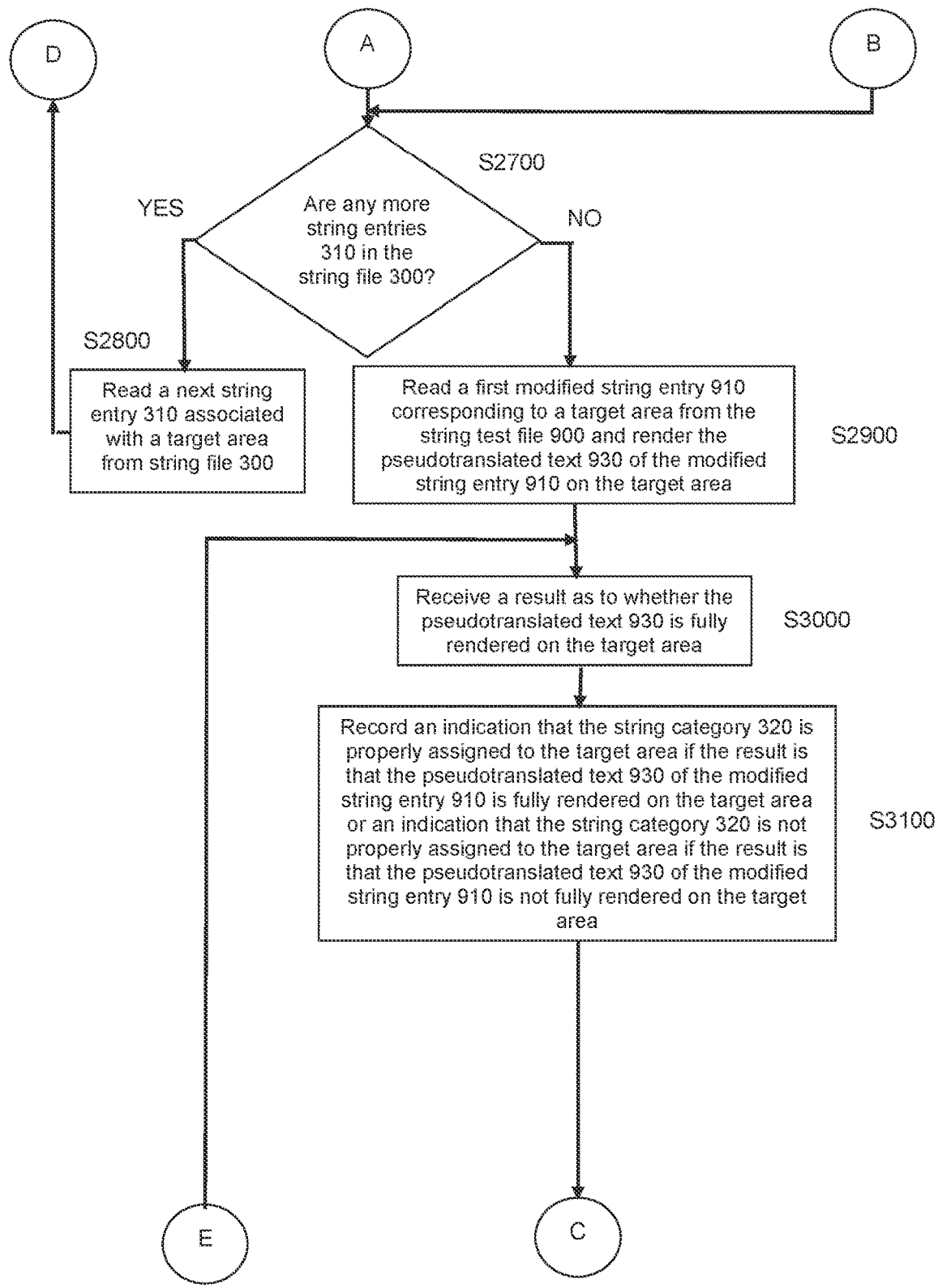
Figure 10C:
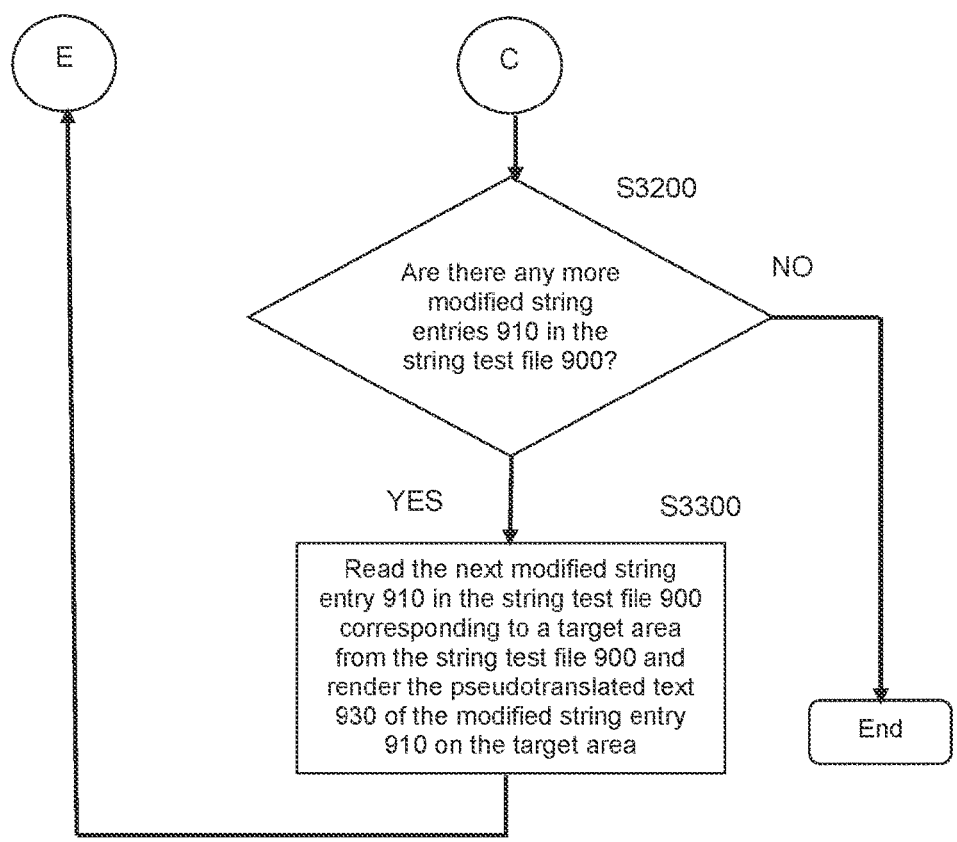

FIGS. 10A-10C illustrate an example of the method (i.e., operations) performed by the processor 110 of the computing system 100 for verifying whether a string category is properly assigned to a target area of a user interface of a device or a target area a graphics file. Initially, it is noted that the computing system 100 has the text category definition file 200 stored in the storage unit 120 or some other memory associated with the computing system 100, obtains the text category definition file 200 via the input unit 130 and stores the text category definition file 200 in the storage unit 120 or some other memory, or accesses the text category definition file 200 at a different location or on a removable medium via the input unit 130.

The computing system 100 then accesses the string file 300 having the at least one string entry 310 associated with a target area of a user interface or graphics file that includes the string category 320 and the string text 330 (S2000). The string file 300 can also be stored in the storage unit 120 or some other memory associated with the computing system 100, or otherwise obtained in a manner similar to the text category definition file 200 as detailed above.

After accessing the string file 300, the computing system 100 reads the first string entry 310 from the string file 300 (S2100) and performs a comparison to determine whether the string category 320 associated with the first string entry 310 corresponds to a defined string category 210 stored in the text category definition file 200 (S2200). If the string category 320 does not correspond to a defined string category 210 in the list of defined string categories 210 (NO), the computing system 100 determines that the string category 320 does not exist (S2300). The computing system 100 also can issue a notification at this time that the string category 320 does not exist via the output unit 140.

On the other hand, if the computing system 100 determines that the string category 320 does correspond to one of the defined string categories 210 (YES), the computing system 100 generates the pseudotranslated text 930 having a width equal to the maximum width information 220 and a height equal to the maximum height information 230 associated with the corresponding defined string category 210 (S2400).

It should also be noted that the string categories 320 of the string entries 310 could have been previously selected directly from the defined string categories 210 and checked for accuracy. If this is the case, the comparison to determine whether the string category 320 associated with the first string entry 310 corresponds to a defined string category 210 stored in the text category definition file 200 (i.e., S2200) becomes unnecessary, and a situation where the computing system 100 determines that the string category 320 does not exist (i.e., S2300) will not occur. In other words, in this alternative scenario, the computing system 100 reads the first string entry 310 from the string file 300 (S2100) and then generates the pseudotranslated text 930 based on the maximum width information 220 and the maximum height information 230 associated with the corresponding defined string category 210 (S2400).

As noted above, the maximum width information 220 and the maximum height information 230 can each be, for example, a numeric value. Therefore, as an example, if the maximum width information 220 is "10" and the maximum height information 230 is "2", the computing system 100 will generate the pseudotranslated text 930 as, for example, two rows (i.e., lines) of text each having ten characters as illustrated in FIG. 11.

The character(s) generated as the pseudotranslated text 930 can be any characters including, for example, full-width characters. Further, the first character and the last character of each row of text of the pseudotranslated text 930 can be different from any of the other characters in the row of text and can be predefined as identifying the first character and the last character of a row. The first character and the last character of each row of text of the pseudotranslated text 930 can also be the same character.

In addition, at least one of the rows of text of the pseudotranslated text 930 can also include at least one additional character (i.e., a number) that indicates how many rows of text are in the pseudotranslated text 930. The at least one additional character that indicates how many rows of text are in the pseudotranslated text 930 can be located at any position between the first character and the last character.

Figure 11:
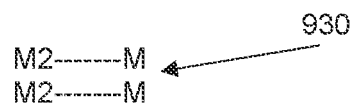
FIG. 11 illustrates an example of pseudotranslated text 930.

In FIG. 11, the first and last characters of each line of text of the pseudotranslated text 930 are "M", the second character of each line of text is "2", which indicates that the pseudotranslated text 930 includes two rows of text, and the remaining characters of each line of text are dashes (—).

Once the pseudotranslated text 930 is generated, the computing system 100 then modifies the string entry 310 associated with the target area of the user interface or graphics file by replacing the string text 330 with the generated pseudotranslated text 930 to create a modified string entry 910 (S2500) and saves the modified string entry 910 in the string test file 900 (S2600) illustrated in FIG. 9.

At this point, the computing system 100 makes a determination as to whether or not there are any more string entries 310 in the string file 300 (S2700). If there are more string entries 310 (YES), the computing system 100 reads the next string entry 310 (S2800), and performs the above-detailed operations with respect to the next string entry 310.

If the computing system 100 determines that there are no more string entries 310 in the string file 300 (NO), the computing system 100 then begins testing the target area of each user interface or graphics file to determine whether the string category assigned to each of the target areas is properly assigned. That is, the computing system 100 reads out a first modified string entry 910 corresponding to the target area of a user interface or graphics file from the string test file 900 and renders the pseudotranslated text 930 of the modified string entry 910 on the corresponding target area of the user interface or graphics file (S2900).

Figure 12A:
FIGS. 12A-12C illustrate examples of the pseudotranslated text 930 that is incompletely rendered.

Once the pseudotranslated text 930 is rendered, the computing system 100 receives a result as to whether the pseudotranslated text 930 is fully rendered on the target area (S3000). The result as to whether or not the pseudotranslated text 930 is fully rendered can be based, in part, on whether the first and last characters in each row of text of the pseudotranslated text 930 are rendered. That is, since the first and last characters are predefined and different from any other characters in each row of text in the pseudotranslated text 930, if the first rendered character of a row of text is not the predefined character, it is apparent that the beginning portion of the pseudotranslated text 930 is not being rendered. An example of a situation where the beginning portion of the pseudotranslated text 930 is not rendered is illustrated in FIG. 12A, which is based on the pseudotranslated text 930 illustrated in FIG. 11. It is apparent that the beginning portion of the pseudotranslated text 930 is not being rendered because the predefined first character "M" is missing from the rows of text.

Figure 12B:

Similarly, if the last rendered character of the rows of text of the pseudotranslated text 930 is not the predefined character, it is apparent that the end portion of the pseudotranslated text 930 is not being rendered. An example of a situation where the end portion of the pseudotranslated text 930 is not being rendered is illustrated in FIG. 12B, which is again based on the pseudotranslated text 930 illustrated in FIG. 11. It is apparent that the end portion of the pseudotranslated text 930 is not being illustrated because the predefined last character "M" is missing from the rows of text.

Figure 12C:

Further, the result as to whether or not the pseudotranslated text 930 is fully rendered can also be based, in part, on whether all of the rows of text of the pseudotranslated text 930 are rendered. That is, as each of the rows of text of the pseudotranslated text 930 can also include at least one character (e.g., number) that indicates the total number of rows of text, if the number of rendered rows of text is different than the number contained in each of the rows of text, it is apparent that at least one of the upper portion or the lower portion of the pseudotranslated text 930 is not being rendered. An example of this is illustrated in FIG. 12C, which is also based on the pseudotranslated text 930 illustrated in FIG. 11. It is apparent that the number of rows of pseudotranslated text 930 rendered (i.e., one) is different from the number contained in the row of text (i.e., 2). Thus, at least one of the upper portion or the lower portion of the pseudotranslated text 930 is not being rendered.

The result as to whether the pseudotranslated text 930 is fully rendered on the target area of the user interface or graphics file can be determined by, for example, an optical recognition system that has been programmed to be able to recognize the predefined first and last characters, as well as the character(s) indicating the number of rows, contained in the pseudotranslated text 930, and provided to the computing system 100 via the input unit 130. The result can also be determined by an operator of the computing system 100 who views the rendered pseudotranslated text 930 on the target area of the user interface or graphics file, and enters the result into the computing system 100 via, for example, the user interface 150.

Once the computing system 100 receives the result, the computing system 100 records an indication that the string category 320 is properly assigned to the target area of the user interface or graphics file if the result is that the pseudotranslated text 930 of the modified string entry 910 associated with the target area of the user interface or graphics file is fully rendered on the target area, or an indication that the string category 320 is not properly assigned to the target area if the result is that the pseudotranslated text 930 of the corresponding modified string entry 910 is not fully rendered on the target area (S3100). The computing system 100 can record the indication in the string test file 900, the storage unit 120, and/or at some other location including in the string file 300.

At this point, the computing system 100 makes a determination as to whether or not there are any more modified string entries 910 in the string test file 900 (S3200). If there are more modified string entries 910 (YES), the computing system 100 reads the next modified string entry 910 (S3300), and performs the above-detailed operations with respect to the next modified string entry 910.

If the computing system 100 determines that there are no more modified string entries 910 in the string test file 900 (NO), the computing system 100 has completed the testing (S3400).

It is noted that the second embodiment of the present disclosure may be implemented as any combination of a system, a method, an integrated circuit, and a computer program on a non-transitory computer readable recording medium. The processor and any other parts of the computing system may be implemented as Integrated Circuits (IC), Application-Specific Integrated Circuits (ASIC), or Large Scale Integrated circuits (LSI), system LSI, super LSI, or ultra LSI components which perform a part or all of the functions of the computing system.

Each of the parts of the second embodiment of present disclosure can be implemented using many single-function components, or can be one component integrated using the technologies described above. The circuits may also be implemented as a specifically programmed general-purpose processor, CPU, a specialized microprocessor such as Digital Signal Processor that can be directed by program instructions on a memory, a Field Programmable Gate Array (FPGA) that can be programmed after manufacturing, or a reconfigurable processor. Some or all of the functions may be implemented by such a processor while some or all of the functions may be implemented by circuitry in any of the forms discussed above.

The second embodiment of the present disclosure may be implemented as a non-transitory computer-readable recording medium having recorded thereon a program embodying the methods/algorithms discussed above for instructing the processor to perform the methods/algorithms. The non-transitory computer-readable recording medium can be, for example, a CD-ROM, DVD, Blu-ray disc, or an electronic memory device.

Each of the elements of the second embodiment of the present disclosure may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory.

The sequence of the steps included in the above-described algorithm are exemplary, and algorithms having a sequence other than the above-described sequences are contemplated. Moreover, steps, or parts of the algorithm, may be implemented simultaneously or in parallel. It is also contemplated that the implementation of the components of the present disclosure can be done with any newly arising technology that may replace any of the above implementation technologies.

The descriptions herein of operations performed by the computing system constitute algorithms and such algorithms can be realized as a computer program on a non-transitory computer readable medium readable by applicable electronic devices serving as the computing system.

The system and method of the second embodiment of this disclosure allow for the verification of whether a string category is properly assigned to a target area of a user interface or graphics file.

It is also noted that although the above description separately describes how the computing system 100 implements the first and second embodiments, the first and second embodiments can be combined and implemented together by the computing system 100.

The invention claimed is:

1. A system, comprising:
an output unit of a patient monitoring system including a display;
a processor configured to:
generate pseudotranslated text associated with a string category assigned to a target area of a user interface of the patient monitoring system, wherein the pseudotranslated text is a reference text comprising a reference length in a horizontal direction and a reference height in a vertical direction, wherein the pseudotranslated text has a height equal to maximum height information of a defined string category corresponding to the string category and a width equal to maximum width information of the defined string category;
render the pseudotranslated text on the target area;
determine a length of at least one string text in the horizontal direction and a height of the at least one string text in the vertical direction;
compare the length of the at least one string text to the reference length of the reference text in the horizontal direction;

compare the height of the at least one string text to the reference height of the reference text in the vertical direction;

determine whether the string text will be rendered fully within the target area;

issue a notification via the output unit of the patient monitoring system based on whether the string text will be rendered fully within the target area; and record whether or not the string category is properly assigned to the target area based on whether the pseudotranslated text is fully rendered on the target area, wherein recording an indication that the string category is properly assigned to the target area if the pseudotranslated text is fully rendered on the target area or an indication that the string category is not properly assigned to the target area if the pseudotranslated text is not fully rendered on the target area.

2. The system of claim 1, wherein the reference text is a full width character.

3. The system of claim 1, wherein if the length of the at least one string text in the horizontal direction is less than or equal to the reference length of the reference text in the horizontal direction, and the height of the string text in the vertical direction is less than or equal to the reference height of the reference text in the vertical direction, determining that the string text will be rendered fully within the target area of the user interface.

4. The system of claim 3, wherein the processor is configured to issue a notification that the string text will be fully rendered within the target area of the user interface.

5. The system of claim 1, wherein if the length of the at least one string text in the horizontal direction is greater than the reference length of the reference text in the horizontal direction or the height of the string text in the vertical direction is greater than the reference height of the reference text in the vertical direction, determining that the string text is unable to be rendered fully within the target area of the user interface.

6. The system of claim 5, wherein the processor is configured to issue a notification that the string text is unable to be fully rendered in the target area of the user interface.

7. The system of claim 1, wherein the length is a predefined length and the height is a predefined height.

8. The system of claim 1, wherein the reference text is selected from a list comprising dashes, em dashes, and vertical bars.

9. The system of claim 1, wherein the processor is configured to verify string size independent of display size, display resolution, and display pixel density.

10. The system of claim 1, wherein the processor is configured on a first device to generate the reference text associated with the string category on another device, and is further configured to determine whether the string text will be rendered fully within the target area of the user interface of the another device.

11. A non-transitory computer readable storage medium comprising instructions that, when executed by at least one processor, cause a device comprising the at least one processor to:

generate a set of pseudotranslated texts associated with a string category assigned to a target area of a user interface of another device, the set including at least a first reference text and a second reference text, the first reference text comprising a reference length in a horizontal direction and the second reference text comprising a reference height in a vertical direction, wherein each pseudotranslated text has a height equal to maximum height information of a defined string category corresponding to the string category and a width equal to maximum width information of the defined string category;

render the pseudotranslated texts on the target area;

determine a length of at least one string text in the horizontal direction and a height of the at least one string text in the vertical direction;

compare the length of the at least one string text to the reference length of the first reference text in the horizontal direction;

compare the height of the at least one string text to the reference height of the second reference text in the vertical direction;

determine whether the string text will be rendered fully within the target area;

issue a notification via an output unit of the device based on whether the string text will be rendered fully within the target area; and record whether or not the string category is properly assigned to the target area based on whether the pseudotranslated texts are fully rendered on the target area, wherein recording an indication that the string category is properly assigned to the target area if the pseudotranslated texts are fully rendered on the target area or an indication that the string category is not properly assigned to the target area if the pseudotranslated texts are not fully rendered on the target area.

12. The non-transitory computer readable storage medium of claim 11, further comprising instructions that, when the length of the at least one string text in the horizontal direction is less than or equal to the reference length of the first reference text in the horizontal direction, and the height of the string text in the vertical direction is less than or equal to the reference height of the second reference text in the vertical direction, cause the device to record that the string category is properly assigned to a target area of the display.

13. The non-transitory computer readable storage medium of claim 11, further comprising instructions that, when the length of the at least one string text in the horizontal direction is greater than the reference length of the first reference text in the horizontal direction or the height of the string text in the vertical direction is greater than the reference height of the second reference text in the vertical direction, cause the device to record that the string category is mismatched to a target area of the display.

14. The non-transitory computer readable storage medium of claim 13, further comprising instructions that issue a notification that the string text is unable to be fully rendered in the target area of the user interface.

15. A method, comprising:

accessing a string file comprising at least one string text and a string category;

generating pseudotranslated text associated with the string category assigned to a target area of a user interface of a device, wherein the pseudotranslated text is a reference text comprising a reference length in a horizontal direction and a reference height in a vertical direction, wherein the pseudotranslated text has a height equal to maximum height information of a defined string category corresponding to the string category and a width equal to maximum width information of the defined string category;

rendering the pseudotranslated text on the target area;

determining a length of at least one string text in the horizontal direction and a height of the at least one string text in the vertical direction;

comparing the length of the at least one string text to the reference length of the reference text in the horizontal direction;
comparing the height of the at least one string text to the reference height of the reference text in the vertical direction;
determining whether the string text will be rendered fully within the target area;
issuing a notification via an output unit of the device based on whether the string text will be rendered fully within the target area; and
recording whether or not the string category is properly assigned to the target area based on whether the pseudotranslated text is fully rendered on the target area, wherein recording an indication that the string category is properly assigned to the target area if the pseudotranslated text is fully rendered on the target area or an indication that the string category is not properly assigned to the target area if the pseudotranslated text is not fully rendered on the target area.

16. The method of claim 15, wherein if the length of the at least one string text in the horizontal direction is less than or equal to the reference length of the reference text in the horizontal direction, and the height of the string text in the vertical direction is less than or equal to the reference height of the reference text in the vertical direction, determining that the string text will be rendered fully within the target area of the user interface.

17. The method of claim 16, further comprising issuing a notification that the string text will be fully rendered within the target area of the user interface.

18. The method of claim 15, wherein if the length of the at least one string text in the horizontal direction is greater than the reference length of the reference text in the horizontal direction or the height of the string text in the vertical direction is greater than the reference height of the reference text in the vertical direction, determining that the string text is unable to be rendered fully within the target area of the user interface.

19. The method of claim 18, further comprising issuing a notification that the string text is unable to be fully rendered in the target area of the user interface.

20. The method of claim 15, further comprising selecting the reference text from a list comprising dashes, em dashes, and vertical bars.

21. The method of claim 15, further comprising verifying string size independent of display size, display resolution, and display pixel density.

* * * * *